United States Patent
De Laurentis et al.

(10) Patent No.: US 9,241,851 B2
(45) Date of Patent: Jan. 26, 2016

(54) HANDS-FREE USER INTERFACE DEVICES

(71) Applicants: Kathryn Jeanne De Laurentis, Tampa, FL (US); Merry Lynn Morris, Tampa, FL (US); Matthew Alan Wills, Crystal Beach, FL (US); Sravan Kumar Elineni, Tampa, FL (US)

(72) Inventors: Kathryn Jeanne De Laurentis, Tampa, FL (US); Merry Lynn Morris, Tampa, FL (US); Matthew Alan Wills, Crystal Beach, FL (US); Sravan Kumar Elineni, Tampa, FL (US)

(73) Assignee: University of South Florida, Tampa, FL (US)

( * ) Notice: Subject to any disclaimer, the term of this patent is extended or adjusted under 35 U.S.C. 154(b) by 503 days.

(21) Appl. No.: 13/573,759

(22) Filed: Oct. 3, 2012

(65) Prior Publication Data

US 2013/0085632 A1    Apr. 4, 2013

Related U.S. Application Data

(60) Provisional application No. 61/542,448, filed on Oct. 3, 2011.

(51) Int. Cl.
| | | |
|---|---|---|
| *A61G 5/00* | (2006.01) | |
| *A61G 5/02* | (2006.01) | |
| *A61G 5/04* | (2013.01) | |
| *A61G 5/10* | (2006.01) | |

(52) U.S. Cl.
CPC ........ *A61G 5/024* (2013.01); *A61G 5/00* (2013.01); *A61G 5/04* (2013.01); *A61G 2005/1051* (2013.01); *A61G 2203/10* (2013.01); *B60L 2200/34* (2013.01)

(58) Field of Classification Search
CPC ........... A61G 5/00; A61G 5/024; A61G 5/04; A61G 2005/1051; A61G 2203/10; B60L 2200/34
USPC .................................................. 701/22, 41, 42
See application file for complete search history.

(56) References Cited

U.S. PATENT DOCUMENTS

| | | | | |
|---|---|---|---|---|
| 4,121,488 | A * | 10/1978 | Akiyama | 434/258 |
| 4,323,829 | A   | 4/1982  | Witney | |
| 4,584,896 | A * | 4/1986  | Letovsky | 434/57 |
| 4,629,181 | A * | 12/1986 | Krive | 482/71 |
| 4,720,789 | A * | 1/1988  | Hector et al. | 463/33 |
| 5,049,079 | A * | 9/1991  | Furtado et al. | 434/253 |
| 5,879,275 | A * | 3/1999  | Aruin | 482/146 |
| 5,925,000 | A * | 7/1999  | Marciniak et al. | 73/172 |
| 5,974,898 | A * | 11/1999 | Golderer et al. | 73/862.043 |
| 6,225,977 | B1* | 5/2001  | Li | 345/156 |
| 6,283,757 | B1* | 9/2001  | Meghnot et al. | 434/33 |

(Continued)

OTHER PUBLICATIONS

Fehr, et al. "Adequacy of Power Wheelchair Control Interfaces for Persons with Severe Disabilities: A Clinical Survey", Department of Veterans Affairs, Journal of Rehabilitation Research and Development vol. 37, No. 3, May/Jun. 2000, pp. 353-360.

(Continued)

*Primary Examiner* — Tuan C. To
*Assistant Examiner* — Dale W Hilgendorf
(74) *Attorney, Agent, or Firm* — Thomas | Horstemeyer, LLP

(57) ABSTRACT

In one embodiment, a hands-free user interface device includes a first plate, a second plate spaced from the first plate, a sensor associated with the plates adapted to detect when the first plate pivots relative to the second plate, and a controller adapted to receive signals from the sensor and output control signals to another component based upon the received signals.

20 Claims, 4 Drawing Sheets

(56) References Cited

U.S. PATENT DOCUMENTS

| | | | |
|---|---|---|---|
| 6,528,351 B1* | 3/2003 | Nathan et al. | 438/118 |
| 7,091,875 B2 | 8/2006 | Ondracek | |
| 7,405,726 B2 | 7/2008 | Pelosi | |
| 7,690,447 B2 | 4/2010 | Kamen | |
| 7,690,958 B2 | 4/2010 | Burgess, Jr. | |
| 7,710,395 B2 | 5/2010 | Rodgers | |
| 7,720,512 B2 | 5/2010 | Tamura et al. | |
| 7,748,490 B2 | 7/2010 | Hornick | |
| 7,812,715 B2 | 10/2010 | Kamen | |
| 8,044,766 B2 | 10/2011 | Ghovanloo | |
| 8,100,770 B2 | 1/2012 | Yamazaki et al. | |
| 8,340,869 B2* | 12/2012 | Wakita et al. | 701/41 |
| 2008/0261696 A1* | 10/2008 | Yamazaki et al. | 463/39 |
| 2009/0093929 A1* | 4/2009 | Weissert et al. | 701/41 |
| 2010/0070132 A1* | 3/2010 | Doi | 701/124 |
| 2010/0137105 A1 | 6/2010 | McLaughlin | |
| 2011/0313604 A1* | 12/2011 | Kume et al. | 701/22 |

OTHER PUBLICATIONS

Goodwin, et al. "Beyond the Wheelchair: The Experience of Dance", University of Saskatchewan, Adapted Physical Activity Quarterly, 2004, 21, 229-247.

Cooper, et al. "Engineering Better Wheelchairs to Enhance Community Participation", IEEE Transactions on Neural Systems and Rehabilitation Engineering, vol. 14, No. 4, Dec. 26.

Posada-Gomez, et al. "A Hands Gesture System of Control for an Intelligent Wheelchair", 2007 4th International Conference on Electrical and Electronics Engineering, Mexico City, Mexico, Sep. 5-7, 2007.

Felzer, et al. "HaWCoS: The Hands-Free Wheelchair Control System", Department of Electrial Engineering and Computer Science, University of Siegen, Assets 2002, pp. 127-134.

Jia, et al. "Head Gesture Recognition for Hands-Free Control of an Intelligent Wheelchair", Dept of Computer Science, University of Essex, Industrial Robot: An International Journal, 2007.

ITB Journal, Issue No. 13, May 2006.

Schrock, et al. "Wheelchair Modification for Hands-Free Motion for Dancers with Disabilities", Proceedings of the ASME 2008 Summer Bioengineering Conference.

Simpson, et al. "The Smart Wheelchair Component System", JRRD, vol. 41, No. 3B, May/Jun. 2004, pp. 429-442.

Simpson, "Smart Wheelchairs: A literature review", JRRD, vol. 42, No. 4, Jul./Aug. 2005, pp. 423-436.

Kuzume, "Input Device for Disabled Persons Using Expiration and Tooth-Touch Sound Signals", Dept. of Information Engineering, Yuge National College, Mar. 22-26, 2010.

Onishi, et al. "A Study of Intuitive Electric Wheelchair Control Interface Based on Weight Shift", Faculty of Engineering, Hosei University, SICE Annual Conference 2008, Aug. 20-22, 2008, The University Electro-Communications.

Yokota, et al. "Electric Wheelchair Controlled by Human Body Motion", Faculty Science and Engineering, Setsunan University, Journal of Robotics and Mechatronics, vol. 22, No. 4, 2010.

Yokota, et al. "The Electric Wheelchair Controlled by Human Body Motion", HSI 2009, Catania, Italy, May 21-23, 2009.

Biddle, et al. "A Slam-Dunk Design for a Wheelchair", Physics Inventions, Feb. 2011 New Inventions and Technologies, http://physicsinventions.com/index.php/a-slam-dunk-design-for-a-wheelchair/.

De Laurentis, et al. "Design of a Robotic Hangs-free Control User Interface", National Academy of Inventors Inaugural, Annual Conference, USF, Feb. 16-17, 2012.

Yokota, et al. "The Electric Wheelchair Controlled by Human Body Motion", Proceedinsg of the 17th IEEE International Symposium on Robot and Human Interactive Communication, Munich, Germany, Aug. 1-3, 2008.

Measurement SpecialtiesTM; FC23 Compression Load Cell Fact Sheet, Retrieved Apr. 2012, from http://www.meas-spec.com.

PG Drives Techonology. Omni Sales Sheet. Retrieved Apr. 2012, from http://www.pgdt.co.uk/pdf/omni.pdf.

University of Pittsburgh: Human Engineering Research Laboratories. Research and Human Engineering Research Overview: Retrieved Jul. 2012, http://www.her.pitt.edu/research.

De Laurentis, et al. Implementation of a P-300 Brain Computer Interface for the Control of a Wheelchair Mounted Robotic Arm System. Proceedings of the 2008 ASME Summer Bioengineering Conference. Paper No. 193253, 2008.

Morris, et al. Dance and Engineering Link to Produce a Novel Mobility Device. Technology and Innovation—Proceedings of the National Academy of Inventors. 13(3):225-231; 2011.

* cited by examiner

HANDS-FREE USER INTERFACE DEVICES

CROSS-REFERENCE TO RELATED APPLICATION(S)

This application claims priority to U.S. Provisional Application Ser. No. 61/542,448, filed Oct. 3, 2011, which is hereby incorporated by reference herein in its entirety.

BACKGROUND

Various equipment is designed to be controlled with a human user's hands. One example of such equipment is power wheelchairs. Such wheelchairs often comprise a joystick that is mounted to an armrest of the chair that can be used to control drive motors of the wheelchair. While joysticks and other hand-operated user interface devices can be effective in such applications, they are less effective when the user has difficulty using his or her hands. In such a case, it may not be possible for the user to control the equipment using a hand-operated user interface device. In view of this, it can be appreciated that it would be desirable to have hands-free user interface devices.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have hands-free user interface devices that can be used to, for example, control operation of a piece of equipment. Disclosed herein are embodiments of hands-free user interface devices that can be used in that capacity. In one embodiment, a hands-free user interface device comprises two plates that are adapted to support all or part of a user's body weight and sensors that can detect pivoting of one of the plates that results from shifting of the user's body weight, for example when the user leans in a particular direction. A control signal can be transmitted by the user interface device in response to the detected pivoting, and that control signal can cause a desired action to be performed. In one embodiment, the user interface device is mounted to a seat of a power wheelchair and the user can control a drive direction of the wheelchair by leaning in a direction in which the user wishes to travel. As is described below, however, the user interface device can be used in substantially any application in which commands are to be communicated by the user using his or her body weight instead of his or her hands.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
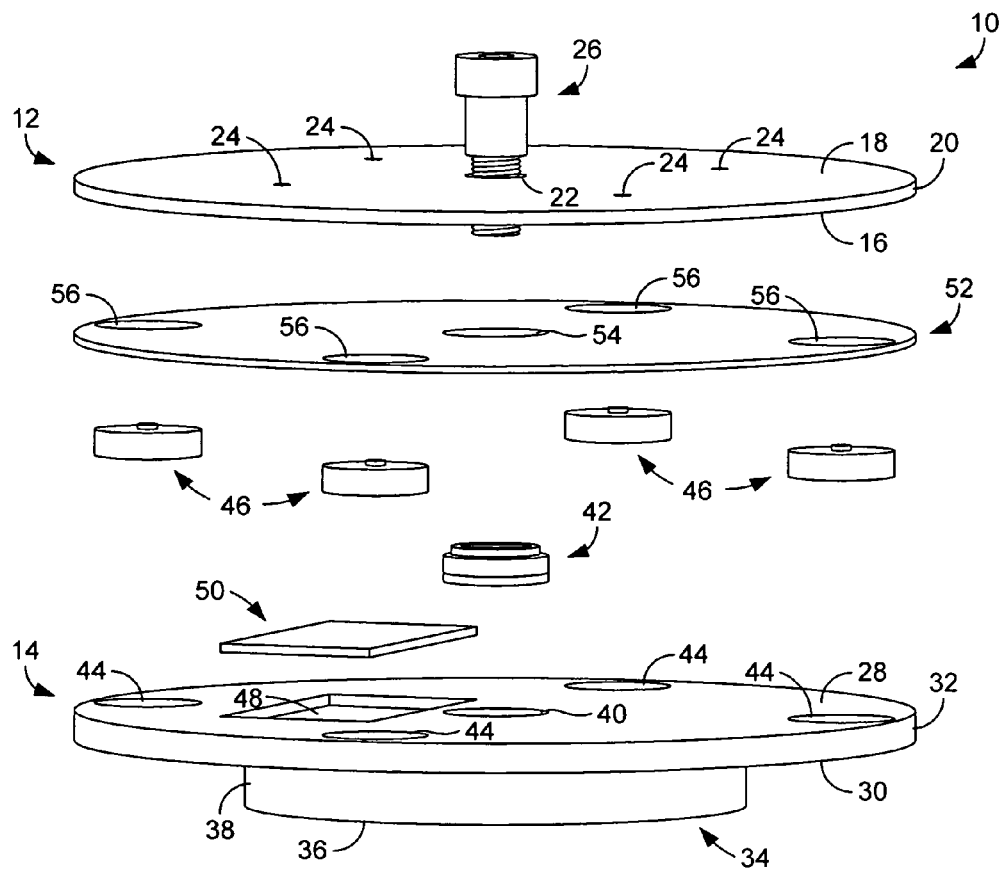
FIG. 1 is an exploded perspective view of a first embodiment of a hands-free user interface device.

FIG. 1 illustrates an embodiment of a hands-free user interface device 10 in an exploded perspective view. As is shown in that figure, the user interface device 10 generally comprises a first or top plate 12 and a second or bottom plate 14. In the illustrated embodiment, the top plate 12 includes a planar bottom surface 16, a planar top surface 18, and a circular edge 20. In addition, the top plate 12 includes a central opening 22 and multiple peripheral openings 24, each of which extends through the plate from the bottom surface 16 to the top surface 18. The central opening 22 is adapted to receive a central fastener 26 that, as is described below, forms part of a ball joint assembly of the user interface device 10. In the illustrated embodiment, the central fastener 26 is a threaded bolt. The peripheral openings 24 are adapted to receive further fasteners (not shown) that can be used to mount the top plate 12 to another component, such as a chair or other weight-bearing component. In some embodiments, the top plate 12 has a diameter of approximately 4 to 36 inches (in.) and a thickness of approximately ⅛ to 6 in.

Figure 2:
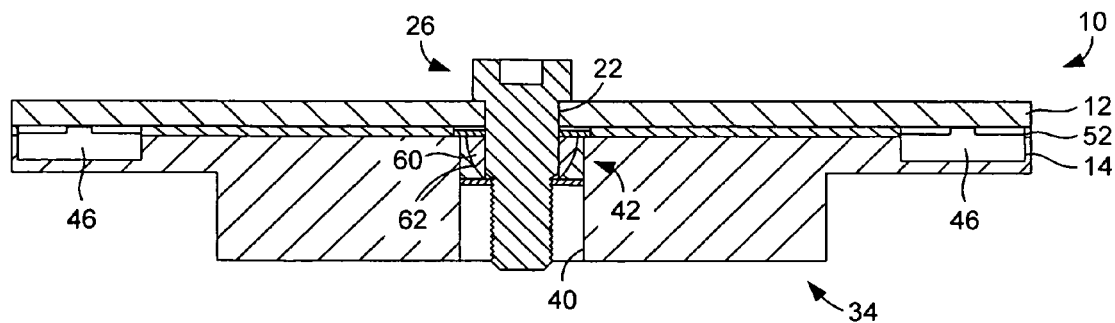
FIG. 2 is a cross-sectional side view of the user interface device of FIG. 1.

The bottom plate 14 includes a planar top surface 28, a planar bottom surface 30, and a circular edge 32. Extending downward from the bottom surface 30 is a bottom member 34 that includes a further planar bottom surface 36 and circular edge 38. As is further shown in FIG. 1, the bottom member 34 is generally concentric with the bottom plate 14 and, as shown in FIG. 2, the bottom member and the bottom plate can be unitarily formed from the same piece of material.

Formed through the bottom plate 14 and the bottom member 34 is a central opening 40 that extends from the top surface 28 of the bottom plate to the bottom surface 36 of the bottom member. The central opening 40 is adapted to receive the central fastener 26 and a ball joint bearing 42, which also forms part of the ball joint assembly. In some embodiments, the top plate 12 has a diameter of approximately 4 to 36 in. and a thickness of approximately ⅛ to 6 in, and the bottom member 34 has a diameter of approximately 4 to 36 in. and a thickness of approximately ⅛ to 6 in.

Formed in the bottom plate 14 are multiple sensor recesses 44 that are adapted to receive sensors 46. In the example embodiment, four sensor recesses 44 are provided at equally spaced positions near the edge 32 of the bottom plate 14 so as to receive four sensors 46. A controller recess 48 is also formed in the bottom plate 14 that is adapted to receive a controller 50, which can be formed on a printed circuit board. In the illustrated embodiment, the sensors 46 are load cells and the controller 50 receives signals from the sensors and transmits control signals to other components based upon the received signals.

The top and bottom plates 12, 14 are made of a strong, rigid material. In some embodiments, the top and bottom plates 12, 14 are both made of a metal material, such as aluminum or steel.

Positioned between the top and bottom plates 12, 14 is a spacer member 52. In some embodiments, the spacer member 52 has a diameter of approximately 4 to 36 in. and a thickness of approximately 1/16 to 6 in. The spacer member 52 can be made of a resilient material, such as a rubber or silicone material that resists relative pivoting of the plates 12, 14 and therefore tends to return the plates to a neutral position in which they are generally parallel with each other. Notably, the spacer member 52 could be replaced with one or more other components, such as springs, that provide that functionality. Extending through the spacer member 52 is a central opening 54 that is adapted to receive the central fastener 26 and the ball joint bearing 42. Also extending through the spacer member 52 are multiple peripheral openings 56 that are adapted to receive the sensors 46.

FIG. 2 is a cross-sectional side view of the hands-free user interface device 10 as assembled. As is apparent from that figure, the ball joint bearing 42 is securely mounted within the central opening 40 formed through the bottom plate 14 and the bottom member 34. The central fastener 26 is passed through the central opening 22 of the top plate 12 and is threaded into the ball joint bearing 42 to secure the top plate 12 to the bottom plate 14 with the spacer member 52 positioned between the two plates. The fastener 26 is received by an internal ball element 60 of the bearing 42 that is seated within an internal socket 62 formed by the bearing. With such a configuration, the fastener 26 can pivot relative to the bearing 42, and therefore the top plate 12 can pivot relative to the bottom plate 14 against the resistance of the spacer member 52. When the top plate 12 pivots relative to the bottom plate 14, for example when a user shifts his or her weight that is supported by the user interface device 10, the top plate presses down upon one or more of the sensors 46. An indication of the magnitudes of the forces is received by the controller 50 from the sensors 46. The controller 50 can then output one or more control signals, for example in the form of one or more voltages, that can be used to control another component.

Figure 3:
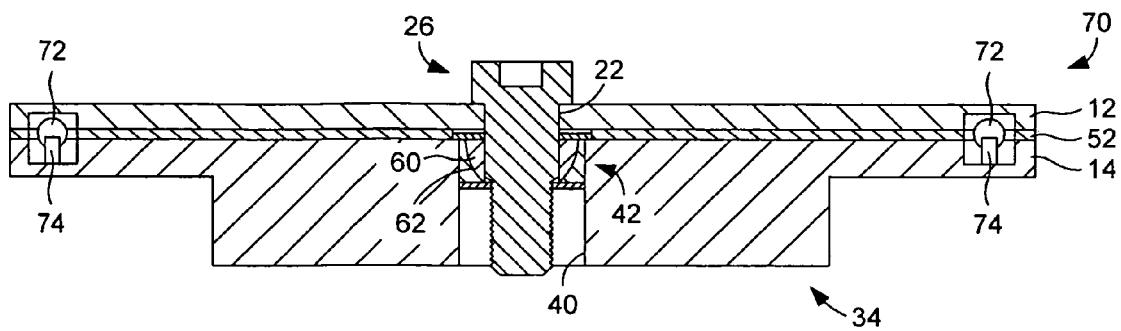
FIG. 3 is a cross-sectional side view of a second embodiment of a hands-free user interface device.

Although the sensors have been described as comprising load cells that sense force, it is noted that the sensors can comprise substantially any sensors that can be used to detect pivoting of one of the plates. Accordingly, the sensors can comprise force sensors, position sensors, accelerometers, or pressure transducers, which can be inductive, electric, magnetic, ultrasonic, optic, or gyroscopic. FIG. 3 illustrates a second embodiment of a hands-free user interface device 70 that uses Hall effect sensors. The user interface device 70 is similar to the user interface device 10 shown in FIGS. 1 and 2, but instead of load cells, the sensors comprise magnets 72 that are mounted to the top plate 12 and opposed transducers 74 that are mounted to the bottom plate 14 that vary their output in response to sensed magnetic fields. Because the magnetic field sensed by the transducers 74 changes as their position in relation to the magnets 72 changes, the Hall effect sensors can therefore be used to detect tilting of the top plate 12. While FIG. 3 shows the magnets 72 mounted to the top plate 12 and the transducers 74 mounted to the bottom plate 14, it is noted that the opposite arrangement is possible.

Figure 4:
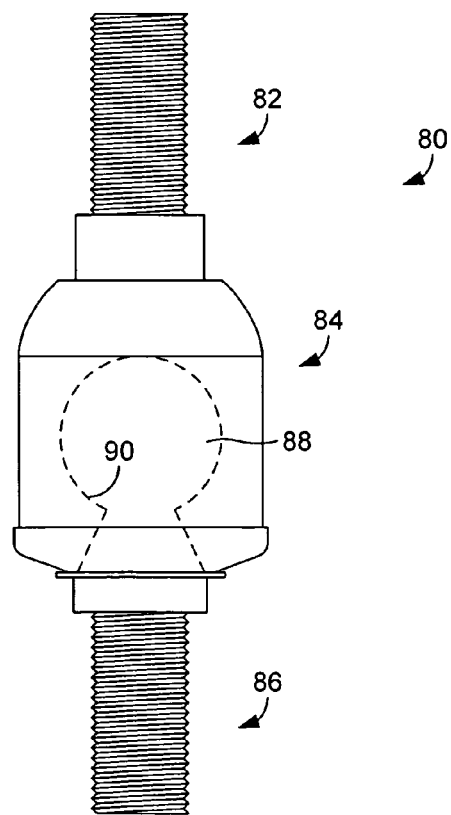
FIG. 4 is a side view of an alternative ball joint assembly that can be used in a hands-free user interface device.

Although a particular ball joint assembly has been described above, substantially any mechanism that enables pivoting of the top plate relative to the bottom plate can be used. FIG. 4 illustrates an alternative ball joint assembly 80. As is shown in that figure, the assembly 80 comprises a first threaded shaft 82 that is connected to an assembly body 84, and a second threaded shaft 86 that is connected to a ball element 88 that is seated within an internal socket 90 formed within the assembly body. The first threaded shaft 82 can be passed through and secured to one of the plates, and the second threaded shaft 86 can be passed through and secured to the other plate to connect the two plates and enable the aforementioned pivoting.

Figure 5:
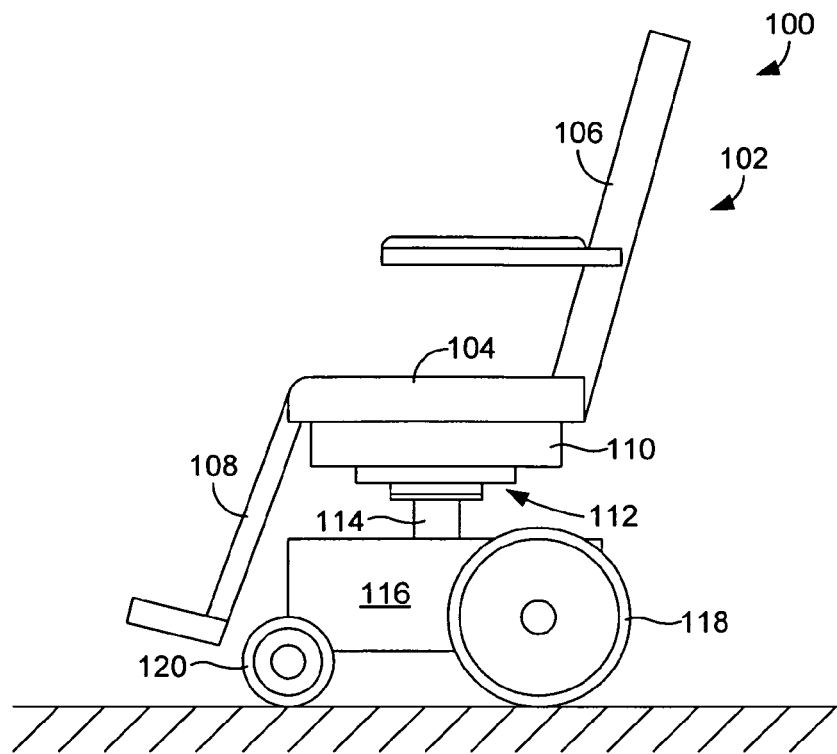
FIG. 5 is a side view of a powered wheelchair that incorporates a hands-free user interface device.

As mentioned above, the hands-free user interface device can be used to control a piece of equipment. One example implementation of this type is integration of the user interface device into a powered wheelchair. FIG. 5 illustrates an embodiment of such a wheelchair 100. As is shown in that figure, the wheelchair 100 comprises a chair 102 that includes a seat 104 and a back rest 106. Extending downward from the seat 104 is a leg support 108. The chair 102 is attached to a mounting bracket 110 that is supported by and mounted to a hands-free user interface device 112 of the type described above. The user interface device 112 is in turn supported by and mounted to a support shaft 114, which extends upward from a base 116 that is supported above the ground or floor by wheels 118 and 120. The base 116 can contain one or more motors (not shown) that can be used to drive one or more of the wheels 118, 120 so as to enable the wheelchair to be driven in a desired direction.

Figure 6:
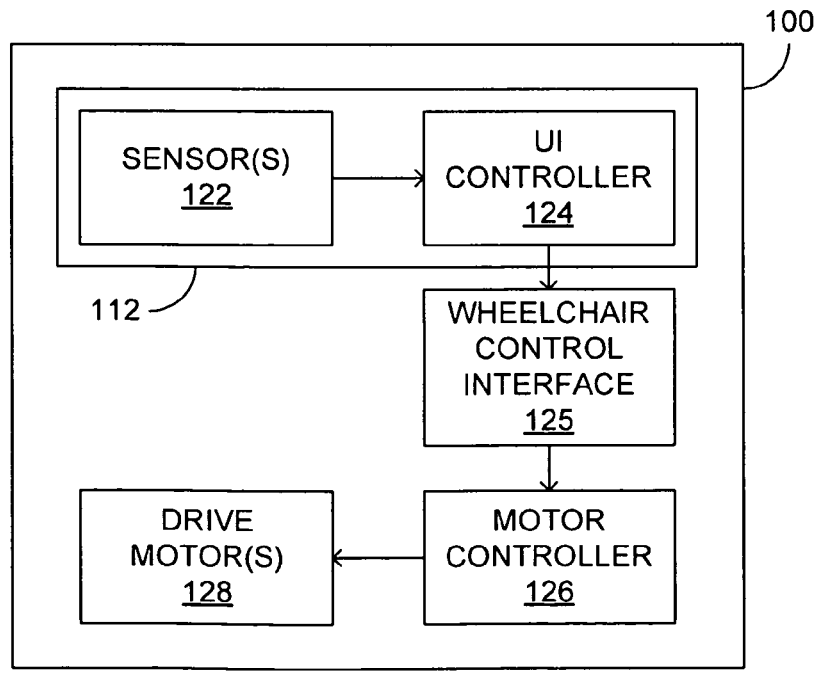
FIG. 6 is a block diagram of electronic components of the power wheelchair of FIG. 5.

When a user sits in the chair 102, at least a portion of the user's body weight is supported by the user interface device 112. The user interface device 112 is calibrated such that no control signals are output when the user is in a neutral sitting position, i.e., when the user is not leaning in any given direction with the intention of driving the wheelchair 100 in that direction. When the user does lean in a particular direction, however, pivoting of the top plate of the user interface device 112 is detected by the sensors of the device and a control signal can be output to drive the wheelchair in that direction. FIG. 6 illustrates an example embodiment of electronic components of the wheelchair 100. As is shown in that figure, sensors 122 can provide signals to the hands-free user interface controller 124, which can then transmit one or more control signals to a wheelchair control interface 125, which in turn provides control signals to a motor controller 126 of the wheelchair 100, which can then send one or more control signals to one or more drive motors 128 of the wheelchair.

It is noted that, when the user interface device 112 includes multiple discrete sensors 122 that are spaced apart from each other (e.g., as shown in FIG. 1), the user interface device can be calibrated to be more or less sensitive to leaning in one or more directions. For example, if it is more difficult for a particular user to lean backward, as opposed to forward or to either side, the sensitivity to signals received from a sensor positioned at the rear of the wheelchair 100 can be increased so that the user need not lean as far backward to cause the wheelchair to drive in the backward direction. Such functionality can be provided by potentiometers of the user interface controller 124 that are associated with the sensors 122.

Figure 7:
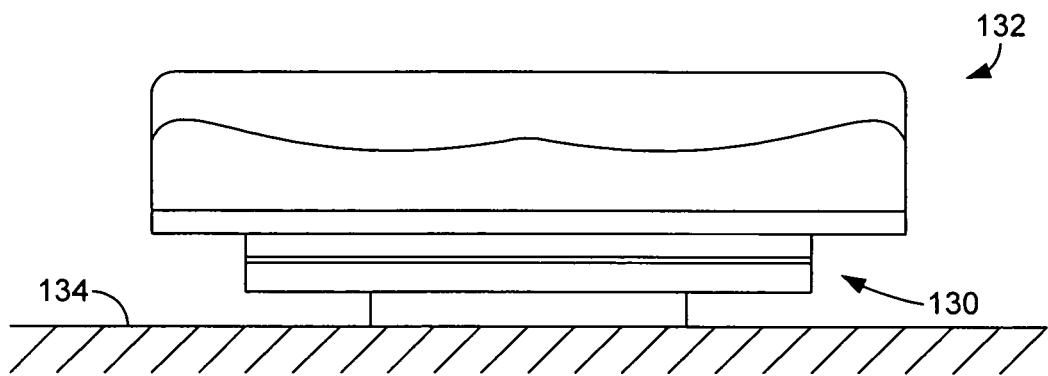
FIG. 7 is a side view of a hands-free user interface device used in conjunction with a seat.

While the hands-free user interface device can be integrated into a piece of equipment like a powered wheelchair, it is noted that the device can be used in other applications. For example, the user interface device can be used to control a separate system, such as a virtual reality system, a gaming system, an exercise system, a robotic system, a vehicle control system, a surveillance system, a weapons control system, and the like. In such circumstances, the user interface device can be used as a standalone control device that can be used to transmit control signals using only the user's body weight, as opposed to his or her hands. FIG. 7 provides an example of such an implementation. In that figure, a seat 132, which is independent from a wheelchair, has been placed upon and/or mounted to a standalone hands-free user interface device 130, which is supported by a support surface 134. In such an embodiment, a user can sit in the seat 132 and pivot in the seat to communicate control signals to an independent system.

Figure 8:
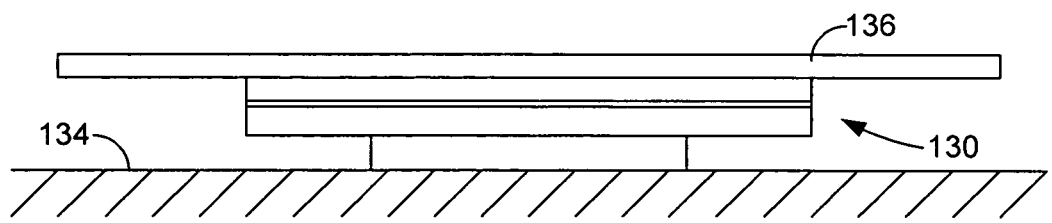
FIG. 8 is a side view of a hands-free user interface device used in conjunction with a weight-bearing platform.

It is further noted that the user need not only control the hands-free user interface device from a seated position. As is shown in FIG. 8, a weight-bearing platform 136 can be placed upon and/or mounted to a standalone hands-free user interface device 130 and the user can stand on, kneel on, lay on, or otherwise support all or a portion of his or her body weight on the platform and lean to generate appropriate control signals. The weight-bearing platform 136 can take many different forms. As an example, the platform 136 could be formed as a surf board when the user interface device 130 is to be used as a controller for a virtual reality and/or gaming system that simulates surfing.

The invention claimed is:

1. A hands-free user interface device for controlling a powered wheelchair, the user interface device comprising:
a first plate;
a second plate spaced from the first plate;
a central pivot element that connects the plates to each other and enables the first plate to pivot relative to the second plate through 360 degrees;
multiple spaced sensors also positioned between the plates adapted to detect when the first plate pivots relative to the second plate in any direction;
a resilient spacer member also positioned between the plates that resists pivoting of the first plate relative to the second plate and therefore tends to return the first plate to a neutral position; and
a controller adapted to receive signals from the sensor and output control signals to the powered wheelchair based upon the received signals.

2. The user interface device of claim 1, wherein the first plate is a top plate having a planar bottom surface and the second plate is a bottom plate having a planar top surface that is generally parallel with the bottom surface of the top plate.

3. The user interface device of claim 1, wherein the second plate comprises recesses formed in a top surface of the plate that are adapted to receive the sensors.

4. The user interface device of claim 1, wherein the second plate comprises a recess formed in a top surface of the plate that is adapted to receive the controller.

5. The user interface device of claim 1, wherein the sensors are equally spaced from the Divot element and each other.

6. The user interface device of claim 5, wherein the central pivot element is connected to the approximate centers of the plates.

7. The user interface device of claim 1, wherein the sensors are load sensors that sense force.

8. The user interface device of claim 1, wherein the sensors are force sensors, position sensors, accelerometers, or pressure sensors.

9. The user interface device of claim 1, wherein the spacer member is a thin, flat resilient member.

10. The user interface device of claim 1, wherein the central pivot element comprises a ball joint assembly that enables pivoting of the first plate.

11. The user interface device of claim 1, further comprising a seat associated with the first plate in which a user can sit.

12. The user interface device of claim 1, wherein the spacer member is approximately the same size in area as the first and second plates and therefore extends to edges of the plates.

13. A user-controlled powered wheelchair, comprising:
a hands-free user interface device including a first plate, a second plate spaced from the first plate, a central pivot element that connects the plates to each other and enables the first plate to pivot relative to the second plate through 360 degrees, multiple spaced sensors positioned between the plates adapted to detect when the first plate pivots relative to the second plate in any direction, a resilient spacer member also positioned between the plates that resists pivoting of the first plate relative to the second plate and therefore tends to return the first plate to a neutral position, and a controller adapted to receive signals from the sensor and output control signals; and
a motor that is adapted to operate in accordance with the control signals.

14. The wheelchair of claim 13, further comprising a seat associated with the user interface device in which a user can sit.

15. The wheelchair of claim 14, wherein the seat is mounted to the first plate and wherein pivoting of the seat causes pivoting of the first plate.

16. The wheelchair of claim 13, wherein the central pivot element is a ball joint assembly that enables the pivoting of the first plate.

17. The wheelchair of claim 13, wherein the first plate is a top plate having a planar bottom surface and the second plate is a bottom plate having a planar top surface that is generally parallel with the bottom surface of the top plate.

18. The wheelchair of claim 17, wherein the second plate comprises recesses formed in its top surface that receive the sensors.

19. The wheelchair of claim 13, wherein the multiple spaced sensors are equally spaced from the pivot element and each other.

20. The wheelchair of claim 13, wherein the spacer member is a thin, flat resilient member.

* * * * *